Patented Jan. 29, 1952

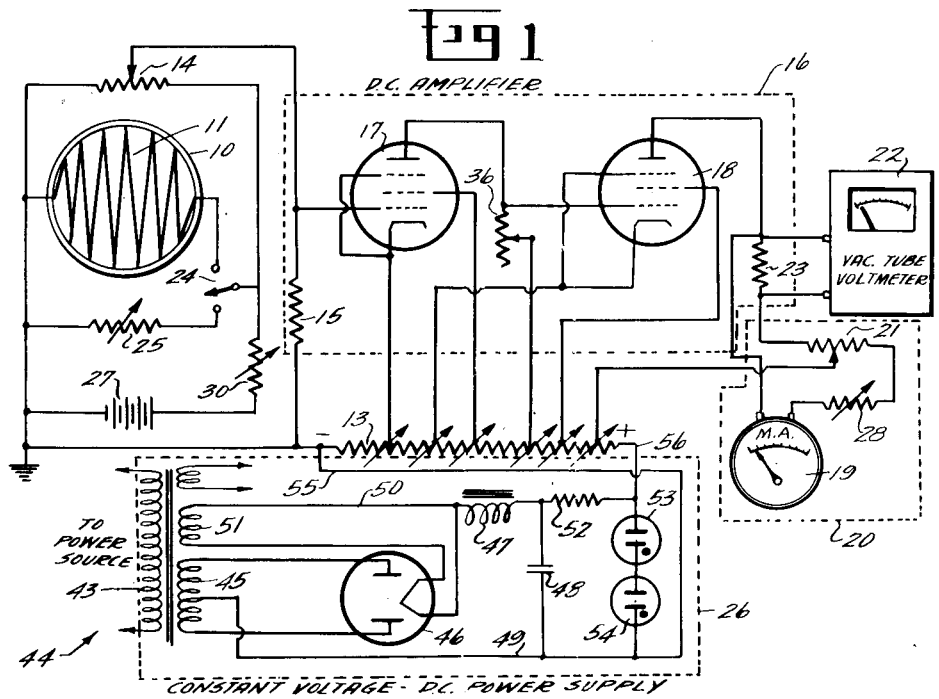
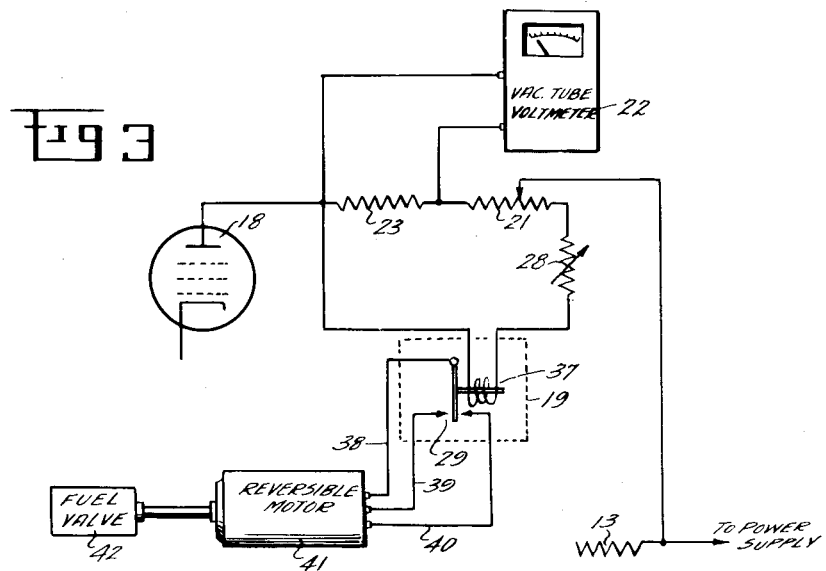

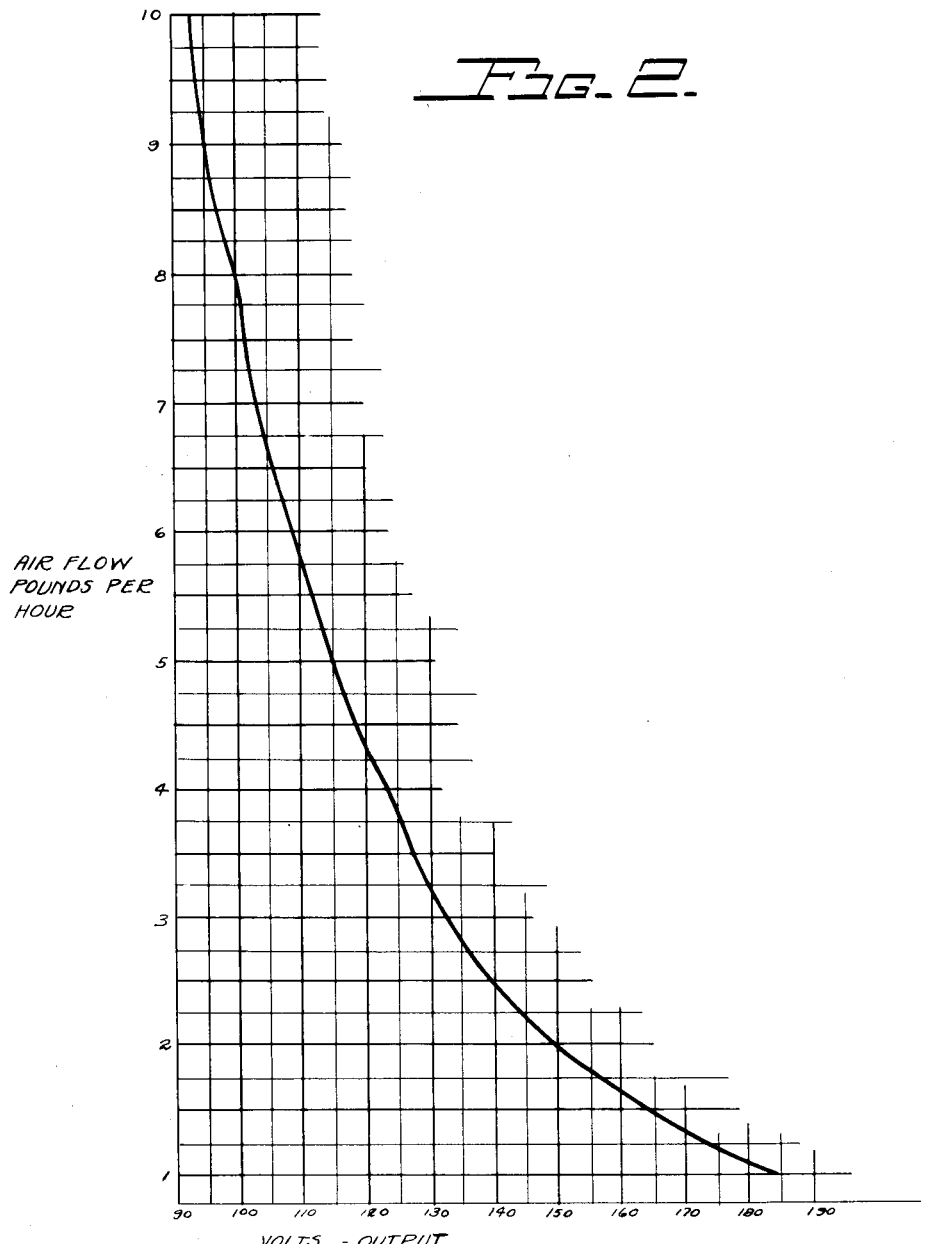

2,583,561

UNITED STATES PATENT OFFICE 2,583,561

ELECTRONIC AIR FLOW INDICATOR

Joseph General and Marvin A. Bennett, Dayton, Ohio

Application October 23, 1946, Serial No. 705,118

8 Claims. (Cl. 73—204)

(Granted under the act of March 3, 1883, as amended April 30, 1928; 370 O. G. 757)

The invention described herein may be manufactured and used by or for the Government for governmental purposes without payment to us of any royalty thereon.

This invention relates to an electronic air flow indicator of the type adapted to measure the volume of air or other fluid passing through a conduit. The device is especially adapted to be used for aeronautical purposes such as checking air flows to gas turbines, turbo-jets and ram jets. It is, however, capable of general application.

Among the objects of the invention are:

(1) To provide a device in which the accuracy of measurement is considerably improved;

(2) To reduce the size of unit needed for measuring a given quantity of gas;

(3) To reduce the length of duct needed for installation;

(4) To provide an instrument readily adapted to be applied to remote-reading indicators;

(5) To provide an instrument insensitive to velocity distribution in the duct in which it is installed;

(6) To provide an instrument in which there is no measurable pressure drop of the fluid stream caused by its presence;

(7) To provide an instrument in which direct current is used for heating the wire grid within the duct so that stable readings can be obtained;

(8) To provide an instrument in which no attempt to maintain a constant temperature need be made.

Some of the benefits resulting from the above properties are:

(a) The grid can be placed in irregularly shaped ducts and still permit the accurate measurement of fluid flow;

(b) The measurement of fluid flow such as that of air at sonic and supersonic velocities can be accomplished;

(c) By altering the length and size of wire used in the grid, the device can be used to measure maximum flow as well as velocity and may be used to control servo-mechanisms and operate throttles, valves, fuel metering devices, etc.

In the drawings:

Fig. 1 is a schematic diagram showing the electronic circuit applied to a cross section of the duct in which the gas flow is to be measured.

Fig. 2 is a curve showing the characteristics of the amplifier output voltage measured against airflow in thousands of pounds per hour for a 10" diameter opening at 100° F.

Fig. 3 is a schematic diagram of a control device circuit which may be added to the diagram shown in Fig. 1.

The principle upon which the invention rests is that a wire grid electrically heated by a constant voltage source is cooled by the gas flow in proportional ratio. The change of temperature produces a corresponding change of resistance of the grid, thereby producing a change in voltage drop across the heated grid. The drop is impressed through suitable electric circuits across the input of a D. C. amplifier. The output of the amplifier is connected to an indicating meter calibrated in air flow units (pounds per hour). Previous devices of this general nature have measured airflow by correlating it with the measured power required to keep the grid at constant temperature.

In Fig. 1, 10 is a cross section of the conduit through which passes the gas stream to be measured. Mounted within the duct 10 is a grid 11 of small diameter, high tensile strength tungsten wire. The grid 11 is connected in series with a variable current-limiting resistance 30 and is connected across a constant voltage source 27. A variable resistance 30 is preferably provided to adjust the current in the grid 11 to a desired value. When a fluid such as air at a temperature lower than that of the grid 11 is passed through the conduit 10, the temperature of the grid 11 is lowered. The resistance of the grid 10 is thereby also lowered, causing an increase in the current flow through the circuit. The change in the voltage drop across the grid 10 is impressed across a voltage divider 14. The latter is so adjusted that an initial calibration voltage can be impressed across a grid resistor 15 as the input to the first stage of a two-stage D. C. amplifier 16. The D. C. amplifier utilizes two stages of high-gain pentode vacuum tubes 17 and 18.

Two output indicators are provided: first, a multi-low-range direct current milliammeter 19. This instrument is calibrated in airflow or other fluid flow units and is connected through a voltage dividing circuit 20 which includes a variable resistor 21 and a protective resistor 28. The circuit 20 and variable resistor 21 are both in the plate circuit of the amplifier tube 18. Second: an electronic voltmeter (vacuum tube voltmeter) 22 is provided and connected across a plate load resistor 23 for the second amplifier tube 18. The voltmeter 22 is also calibrated in airflow units. An initial reference point is obtained by varying the position of the tap on the input voltage divider 14, such tap constituting a voltage selector. A single-pole double-throw switch 24 is positioned so that it may connect either the grid 11 and its associated circuit across the grid resistor 15, or alternatively a pre-set resistor 25 having a known resistance equal to the hot-wire resistance of the grid 11. This arrangement provides a ready calibration check that can be used whenever the device is suspected of needing such a check during operation. The operating reading should agree with the pre-set reading when the same conditions are being observed. Otherwise it is an indication of loose connections, tube failure or other electrical trouble.

In order to stabilize the device, a regulated (constant D. C. voltage) power supply 26 is used, the output of which is connected across a suitable bleeder resistor 13.

Line voltage (110 volt—60 cycle) is impressed on the primary 43 of a power step-up transformer 44. High voltage A. C. from a secondary 45 of the transformer 44 is supplied to the plates of a full-wave rectifying tube 46. This combination of transformer 44 and rectifier 46 supplies high voltage D. C. to a filter choke 47 and a filter capacitor 48. The D. C. voltage developed across the capacitor 47 is connected across a series circuit the conductors of which are 49 and 50. In the series circuit 47—52—53—54, a limiting resistor 52 and two glow discharge regulator tubes 53 and 54 are connected across the D. C. voltage which appears across capacitor 48. The limiting resistor 52 limits the flow of current through the regulator tubes 53 and 54, keeping this current within the rating of the tubes. These tubes act as a stubborn variable resistor having a range between 30,000 to 5,000 ohms and maintain a fixed voltage across the output terminals 55 (negative) and 56 (positive) by changing the resistance of the tubes 53 and 54 in order to maintain the desired voltage drop. The voltage applied to the bleeder resistor 13, used to supply voltage to the D. C. amplifier 16 is thereby held constant. In order to maintain a voltage of 300 volts across the bleeder resistor 13, two VR-150 voltage regulator tubes are used in series as 53—54, shown. No novelty per se is claimed for the internal arrangement of the constant voltage D. C. power supply 26.

The resistor 13 is tapped so that the voltages to the vacuum tube elements 17 and 18 can be adjusted for maximum overall gain and stable operation. A battery 27 or constant voltage output rectifier is used to maintain constant voltage for the heating current necessary to raise the temperature of the grid 11.

Voltage changes produced by air flow across the heated tungsten grid 11 are impressed across the grid resistor 15 of first stage pentode vacuum tube 17. The suppressor grid and cathode of this vacuum tube are connected together and are connected to a suitable point on the bleeder resistor 13, allowing a minimum of plate current to flow through a plate load resistor 36 of the pentode vacuum tube 17. A constant potential lower than the plate potential is connected to the screen grid in order to reduce the capacity effect between the grid and plate elements. A change in voltage across the grid resistor 15 produces a corresponding amplified change in voltage due to change in plate current across the plate load resistor 36. This voltage produced is directly connected to the grid of the second stage pentode vacuum tube 18, the cathode and suppressor grid of which are tapped back on the bleeder resistor 13 sufficiently to compensate for the positive voltage from the plate to the cathode of the second pentode amplifier vacuum tube 18. The voltage drop across the plate load resistor 36 of the first stage is a corresponding amplified voltage to that produced across the plate load resistor 23 of the second amplifier tube 18. It is measured by the electronic voltmeter 22 connected directly across the plate load resistor 23. The low range milliammeter 19 is connected in series with the plate current to the second amplifier tube 18 and by means of a potentiometer 21 can be adjusted to follow the voltmeter readings both of which can be calibrated in air flow units. All vacuum tube element voltages are kept constant by means of voltage regulator tubes and constant potential transformers.

In order to use this device as a metering and controlling unit suitable solenoids, relays or servo-mechanisms should be inserted into the circuit in place of, or together with the milliammeter 19 or the electronic voltmeter 22. The graphic symbols used in Fig. 1 of the drawings for elements 19 and 22 represent therefore either themselves alone or with solenoids, relays or servo-mechanisms or the solenoids, relays or servo-mechanisms alone. Since a large number of combinations are possible, it is not feasible to illustrate all of them here nor necessary, since persons skilled in the art and in possession of this disclosure can readily make and use the substitutes.

The graph which is the subject of Fig. 2 will be understood without further explanation.

Numerous changes may be made in the device without departing from the spirit of the invention. For example, it is not necessary to employ both meters 19 and 22. In the preferred form of the invention, the milliammeter 19 is dispensed with or may be substituted by one of the control devices mentioned. Or, if it is retained, the substitution of a control device may be made for the electronic voltmeter 22.

Fig. 3 illustrates one form of control device substituted for the milliammeter 19 and such connections thereto as will make a complete and operative fuel metering valve for aircraft engines. In this figure, a coil 37 of a single-pole double-throw relay 29 is shown within a box of dotted outline, the box indicating the extent of substitution for milliammeter 19. The relay 29 is preferably of the "Sensitrol" type. Resistance 28 is made variable for the initial limiting of current through the relay coil 37.

Connected to the relay 29 by three leads 38, 39, and 40 from the switch arm and the two poles respectively of the relay, there is provided a reversible motor 41 which is operatively connected to a fuel valve 42. Motor 41 is "off" in the position shown. For control operation, the relay 29 is first adjusted between the required limits and the variable resistance 28 is set to pass a current that is safe for the relay. Switch 24 is closed to the left. The grid 11 then becomes heated. After its full temperature is reached, the fluid current is started through the duct 10. The direction of flow is immaterial.

Closing switch 24 to the lower position initiates electronic operation identical with that which has been described. Since the "Sensitrol" relay 29 is primarily an ammeter in which the pointer makes contact at the ends of an adjustable scale, the contact at one end giving an action the reverse of the contact at the other end, it will be seen how reversal of motor 41 is accomplished. The relay 29 is first adjusted to the desired upper and lower limits, then an increase of current to a maximum will operate motor 41 in one direction and a minimum current will operate it in the other.

The invention claimed is:

1. In an electronic fluid flow indicator, a wire grid of high electrical resistance, a constant-voltage for heating said grid, connections between said constant voltage source and said grid, means for directing a flow of fluid through said grid to lower the temperature of the grid and produce a change in the voltage drop across it, a direct current amplifier having an input grid, a connection between said grid and the input grid of the direct current amplifier including a voltage divider connected across said grid to adjust the input voltage to the direct-current amplifier, a second constant voltage source for said amplifier, connections between said constant voltage source and said amplifier for supplying plate voltage thereto, the connection between the high resistance grid and the input grid including the voltage divider impressing upon said amplifier the voltage drop across the grid, a vacuum tube voltmeter calibrated in flow units and means for impressing the voltage output of said amplifier on said vacuum tube voltmeter.

2. In an air flow indicator, a grid of high resistance, small diameter wire mounted across a conduit through which a fluid stream is flowing, a constant voltage source for heating said high resistance grid, connections between said high resistance grid and said voltage source, an amplifier, a voltage stabilized power supply for said amplifier, a connection between said power supply and said amplifier, comprising a voltage divider connected across the output of said voltage-stabilized power supply, and a voltage selector comprising variable taps on said voltage divider connected from said amplifier to selected points on said voltage divider to furnish a constant voltage for said amplifier, connections for impressing across the amplifier the voltage drop created across the high resistance grid by the cooling effect of the fluid stream and a low range milliammeter calibrated in terms of flow units and a calibrated variable resistor connected in series with the plate current from the voltage-stabilized power supply.

3. In a fluid flow indicator, a grid of high resistance, small diameter wire mounted across a conduit through which a gas stream is flowing, a constant voltage source for heating said high resistance grid, connections between said voltage source and said high resistance grid, an amplifier having an input grid, a connection between the high resistance grid and said input grid, for impressing across the amplifier the voltage drop created across the high resistance grid by the cooling effect of the gas stream, a voltage-stabilized power supply connected to said amplifier, a voltage divider connected across the output of said voltage-stabilized power supply, said power supply being connected to said amplifier through said voltage divider, a voltage selector comprising variable taps on said voltage divider connected from said voltage divider to selected points on said amplifier to furnish constant voltages for the latter, a plate load resistor connected to said amplifier to receive the output of said amplifier and an electronic voltmeter connected across said plate load resistor and calibrated in terms of fluid flow units.

4. In a fluid flow indicator, a grid of high resistance, small diameter wire mounted across a conduit through which fluid stream is flowing, a constant voltage source for heating said high resistance grid, connections between said voltage source and said grid, an amplifier, a voltage stabilized power supply for said amplifier, connections between the amplifier and power supply comprising a voltage divider connected across the output of said voltage-stabilized power supply and a voltage selector comprising variable taps on said voltage divider connected to said amplifier at selected points on said voltage divider to furnish constant voltages for the amplifier, connections for impressing across the amplifier the voltage drop created across the high resistance grid by the cooling effect of the gas stream, a plate load resistor connected to said amplifier to receive the output of said amplifier, a circuit for delivering the amplifier output to said plate load resistor, an electronic voltmeter connected across said plate load resistor and calibrated in terms of fluid flow units and an electromagnetic control device connected to the plate load resistor circuit.

5. In an airflow indicator, a grid of high resistance, small diameter wire mounted across a conduit through which a fluid stream is flowing, a constant voltage source connected across said grid for heating said grid, an amplifier having an input grid, connections between said high resistance grid and said amplifier input grid for impressing across the amplifier the voltage drop created across the high resistance grid by the cooling effect of the fluid stream, a voltage-stabilized power supply for said amplifier comprising a voltage divider connected between said amplifier and said power supply, a voltage selector comprising variable taps on said voltage divider connected from selected points on said voltage divider to furnish constant voltage for the amplifier, a low-range milliammeter calibrated in terms of fluid flow units and connected in series with the plate current from the voltage-stabilized power supply, a calibrated variable resistor in series with said milliammeter, a plate load resistor connected to receive the output of said amplifier and an electromagnetic control device connected to said plate load resistor.

6. In an electric measuring circuit, a wire grid of high electrical resistance, a constant voltage source for heating said high resistance grid, connections between said voltage source and said high resistance grid, a direct current amplifier comprising a plurality of vacuum tubes, each having an input grid, a constant voltage source for said amplifier, connections between said amplifier and said voltage source, a voltage divider connected across said high resistance grid, connections between said voltage divider and said amplifier for impressing upon said amplifier input grid the voltage drop across the high resistance wire grid, a plate load resistor connected to the final vacuum tube of said amplifier and a vacuum tube voltmeter connected across said plate load resistor.

7. In an electric measuring circuit, a wire grid of high electrical resistance, a constant voltage source, connections between said voltage source and said grid for heating said high resistance grid, a direct current amplifier comprising a plurality of vacuum tubes each having an input grid, a constant voltage source for said amplifier, connections between said amplifier and said voltage source, a voltage divider connected across said high resistance to adjust the input voltage to the input grid of the direct current amplifier, connections between the said high resistance grid and the input grid of said amplifier for impressing upon said amplifier the voltage drop across the wire high resistance grid, a plate load resistor connected to the final vacuum tube of said amplifier and at least one electromagnetic instrument connected across said plate load resistor.

8. In a fluid flow indicator, a grid of high resistance, small diameter wire mounted across a conduit through which a gas stream is flowing, a constant voltage source, connections between said voltage source and said high resistance grid for heating said high resistance grid, an amplifier having an input grid, connections between said high resistance grid and said input grid, for impressing across the amplifier input grid the voltage drop created across the high resistance grid by reason of cooling effect of the gas stream, a voltage-stabilized power supply for said amplifier, a voltage divider connected across the output of said voltage-stabilized power supply, a voltage selector comprising variable taps on said voltage divider connected from said voltage divider to selected points on said amplifier to furnish constant voltages for the latter, and a plate load for said amplifier connected to the output thereof, said plate load including a device responsive to the output of said amplifier.

JOSEPH GENERAL.
MARVIN A. BENNETT.

REFERENCES CITED

The following references are of record in the file of this patent:

UNITED STATES PATENTS

| Number | Name | Date |
|---|---|---|
| 1,156,660 | Berg | Oct. 12, 1915 |
| 2,337,884 | Hillman | June 12, 1945 |
| 2,412,471 | Olson | Dec. 10, 1946 |